United States Patent
Tanaka

Patent Number: 5,809,767
Date of Patent: Sep. 22, 1998

[54] CHAIN WITH SWELLING SEAL BODY

[75] Inventor: Koji Tanaka, Osaka, Japan

[73] Assignee: Tsubakimoto Chain Co., Osaka, Japan

[21] Appl. No.: 923,248

[22] Filed: Sep. 4, 1997

[30] Foreign Application Priority Data

Sep. 6, 1996 [JP] Japan ..................................... 8-236558

[51] Int. Cl.⁶ ............................. F16G 13/02; F16G 13/06
[52] U.S. Cl. ........................ 59/5; 59/78; 59/93; 474/207
[58] Field of Search .................................. 59/4, 5, 78, 84, 59/93; 474/206, 207

[56] References Cited

U.S. PATENT DOCUMENTS

| 3,135,128 | 6/1964 | Rudolph | 474/207 |
| 3,492,885 | 2/1970 | Nolte | 474/207 |
| 5,459,993 | 10/1995 | Kuriyama et al. | 59/4 |

FOREIGN PATENT DOCUMENTS

| 50-134552 | 11/1975 | Japan. | |
| 59-127965 | 8/1984 | Japan. | |
| 238734 | 9/1989 | Japan | 59/4 |
| 6-69531 | 9/1994 | Japan. | |

*Primary Examiner*—David Jones
*Attorney, Agent, or Firm*—Armstrong, Westerman, Hattori, McLeland & Naughton

[57] ABSTRACT

A chain with a seal body has a swelling seal body arranged between respective inner and outer plates provided on either side on a connecting pin. Any one of a water absorbent, an oil absorbent, and both a water and oil absorbent is contained in the base material resin of the seal body so that a swelling property is imparted to the seal body. When any one of water and oil is present around the chain, any one of the water and oil, respectively, penetrates into the clearance between the seal body and the plate to swell the seal body in the clearance part. Thus, the primary purpose of the chain with a seal body is to block a clearance between the inner and outer plates and the seal body in the chain by utilizing any one of the water absorbent, the oil absorbent, and the water and oil absorbent contained in the seal body.

3 Claims, 1 Drawing Sheet

CHAIN WITH SWELLING SEAL BODY

FIELD OF THE INVENTION

This invention relates to a chain having a seal or O-ring (hereinafter referred to as "seal body") for preventing the leakage of lubricating oil and abrasive powder and also preventing the penetration of foreign matters from the outside. The seal or O-ring is arranged between inner and outer plates. The chain according to the present invention is particularly suitable for use in an underwater atmosphere and in an atmosphere where it is required to prevent the contamination of products such as in the food manufacturing field, by swelling the seal body containing an oil absorbent and/or water absorbent, to thereby eliminate a clearance produced between the seal body and the plate.

DESCRIPTION OF THE RELATED ARTS

In Japanese Utility Model Publication No. 55-34353 (JP '353), a conventional chain with seal body is formed of, for example, a chain having a seal body pressed to or making contact with inner and outer plates between the inner and outer plates provided on either side of a connecting pin to prevent the penetration of foreign matters between the connecting pin and a bushing, and also having a lubricating oil sealed in the inner part of the seal body.

However, the conventional chain described in JP '353 has a problem in that either the distortion or camber of the plate or a poor parallelism between plates causes an irregular clearance between the seal body and the plate. Thus, all or a part of the seal body cannot be pressed to or make contact with the plate. This allows the penetration of foreign matters through the clearance to reduce the function of the chain, or the leakage of lubricating oil or abrasion powder through the clearance to contaminate products.

In the use of the conventional chain described in JP '353 in an underwater atmosphere such as in the food manufacturing field, a serious problem of contamination of foods due to the lubricating oil or the abrasion powder in the water occurs as the water flow rises. On the other hand, when the seal body is strongly pressed to the plate in order to prevent the outflow of the lubricating oil or similar, a problem of a remarkable reduction in transmission efficiency of the chain due to the increase in bending resistance of the chain also rises.

SUMMARY OF THE INVENTION

The present invention solves the problems described above by providing a chain with a seal body which includes: a connecting pin; inner and outer plates; and a swelling seal body containing any one of a water absorbent, an oil absorbent and both a water and an oil absorbent located between the inner and outer plates which are provided on either side of a connecting pin.

The water absorbent and the oil absorbent contained in the seal body absorbs water and oil, respectively, to swell the seal body. When a clearance is present between the seal body and the plate, the water and oil, respectively, penetrates the clearance along the surface of the seal body, whereby the seal body is radially swollen, and also axially swollen in the clearance part. The seal body is closely fitted to the plate by the axial swelling to eliminate the clearance. When the clearance is eliminated, the seal body is never axially swollen further by the water and oil, respectively, the excessive swelling is radially dispersed, and the seal body seals the plate with a proper pressing force. Thus, original functions of the seal body to prevent foreign matter penetration from the outside and to prevent leakage of lubricating oil or abrasive powder from the seal body inner part can be exhibited, and an increase in bending resistance of the chain can be prevented by the self-regulation of pressing force to the plate.

The chain with a seal body of the present invention is suitable when the plate is partially distorted or cambered. Namely, when the plate is distorted or cambered, a clearance is produced between the plate and the seal body. Since the seal is swollen in the part making contact with water and oil, respectively, the seal is axially swollen in the clearance part to eliminate the clearance, and radially swollen in the part other than the clearance part. When the clearance is eliminated by the axial swelling, the further swelling is radially dispersed. Namely, the seal body containing any one of the water absorbent, the oil absorbent and both the water and oil absorbent so functions as to self-detect the clearance by using the surrounding water and oil, respectively, to block the clearance.

The swelling of the seal body is caused by the use of the chain in any one of an underwater atmosphere and an oil atmosphere, and the seal body is preferably swollen in advance by intentionally and forcedly spraying water and oil, respectively, after the manufacture of the chain and before the use of the chain. Even in the use of the chain in any one of an underwater atmosphere and an oil atmosphere, the original functions of the seal body can be enhanced more by preliminarily swelling the seal body in this way.

Further, when the oil absorbent for absorbing lubricating oil of the chain is contained in the seal body, the seal body is swollen by the lubricating oil of the chain. Such a constitution ensures the prevention of leakage of lubricating oil.

BRIEF DESCRIPTION OF THE DRAWING FIGURE

FIG. 1 is a cross-sectional view of a chain with a swelling seal body according to the present invention.

DETAILED DESCRIPTION OF THE INVENTION

Figure 1:
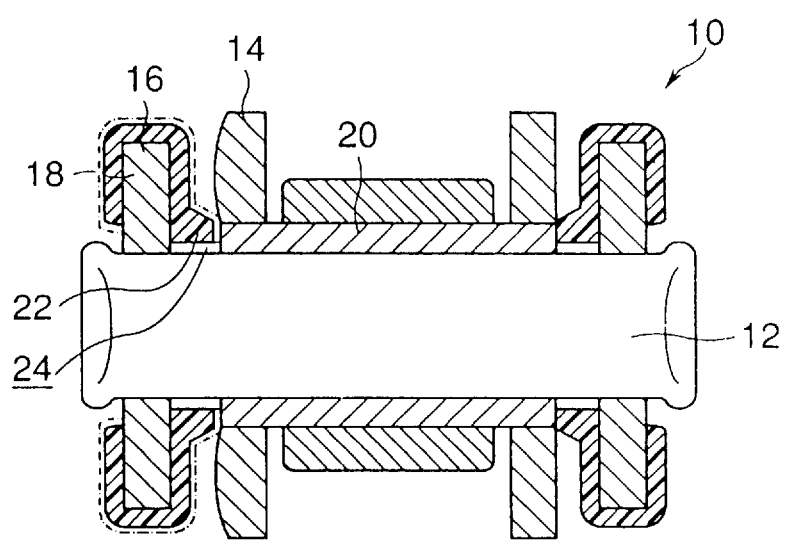

A chain 10 with a seal body according to the present invention has a swelling seal body 18 between respective inner and outer plates 14,16 provided on either side of a connecting pin 12 as shown in a cross-sectional view in FIG. 1. The seal body 18 has an annular lip part 22 fitted to the outer plate 16 to enclose the sliding surface end parts of the pin 12 and a bushing 20. The lip part 22 may be opposed to either the inner plate 14 or the bushing 20, and an annular space 24, for sealing any one of lubricating oil and abrasion powder, is formed in the inner part of the lip part 22. A seal body 18, such as the one which encloses the pin between the inner and outer plates as an O-ring, may be used. In addition to the chain shown in the drawing, the seal body may be arranged on a chain having links of the same form connected to each other as an offset link chain.

The swelling property is imparted to the seal body 18 by containing any one of the water absorbent and the oil absorbent in the base material resin of the seal body 18. For example, the seal body containing the water absorbent is used in the chain used in an underwater atmosphere, and the seal body containing the oil is used in the chain used under an oil atmosphere. The oil absorbent to be swollen by the lubricating oil sealed between the sliding surfaces of the pin 12 and the bushing 20 is contained in the seal body, whereby a self-sealing property is imparted to the chain. The seal body 18, of course, may contain both the water absorbent and the oil absorbent. Such a seal body is useful when using the chain in a cutting liquid having oil content emulsified in water, and has the effect of never limiting the use of the chain.

By containing any one of the water absorbent and the oil absorbent in the seal body in this way, the clearance, when caused between the seal body and plate by means of camber or distortion, is detected by any one of the water and the oil located around the chain to swell the seal body, whereby the seal body is axially swollen in the clearance part to block the clearance. When the clearance is eliminated by the swelling, any one of the water and the oil, respectively, never penetrates this part. Thus, the seal body is pressed to the plate with a proper pressing force without being swollen further.

An example of swelling the seal body in the use of the chain by utilizing any one of the water and the oil under water atmosphere and oil atmosphere, respectively, is described above, wherein it is preferred that the seal body be intentionally and forcedly swollen in advance. Namely, in the assembling of the chain, any one of water and oil, respectively, is preferably sprayed onto the seal body to cause the seal body to swell, thereby preliminarily eliminating the clearance to complete the chain. When such a chain is used in any one of an underwater atmosphere and an oil atmosphere thereafter, dust penetration or abrasion powder scattering can be surely prevented just after the start of use.

As the base material resin of the seal body, polyethylene, ethylene-vinyl alcohol copolymer, ethylene-vinyl acetate copolymer, polypropylene, poly-4-methylpentene, polybutylene terephthalate, polyamide, polyacetal, polycarbonate, polysulfone, polyether sulfone, polyphenylene sulfide, polyarylate, polyether etherketone, polyester, polyamide imide, polytetrafluoroethylene, liquid crystal polymer, polyether imide, polyimide, polyurethane, silicon resin, phenol resin, melamine resin, unsaturated polyester, polystyrene thermoplastic elastomer, polyolefin thermoplastic elastomer, polydiene thermoplastic elastomer, chlorine thermoplastic elastomer, polyurethane thermoplastic elastomer, polyamide thermoplastic elastomer, fluorine thermoplastic elastomer, vulcanized rubber, and similar are used. Among them, polyethylene, ethylene-vinyl alcohol copolymer or ethylene-vinyl acetate copolymer is preferably used with considerations of economic property and sealing performance.

As the water absorbent, synthetic polymers, or polyacrylate, polyvinyl alcohol, polyoxyethylene, and polyacrylamide can be used and so too are starch and cellulose water absorbents also usable.

As the oil absorbent, polynorbornene, alkylstyrene, or a copolymer crosslinked body such as alkyl (meth) acrylate, hydroxyalkyl (meth) acrylate or similar can be used.

Any one of the water absorbent and oil absorbent is contained in an amount of 0.01–50% by weight to the base material resin. With less than 0.01% by weight, the swelling property of the seal body cannot be provided, whereas with above 50% by weight, the molding limit, as the seal body product is molded, is exceeded. Any one of the water absorbent and oil absorbent is preferably contained in an amount of 1–5% by weight to the base material resin, because a remarkable swelling property of the seal body of the chain can be provided within this range.

More specifically, a seal body having 5% of a thermoplastic polyethylene oxide (trade name: AQUACALK, manufactured by Sumitomo Seika Chemicals) as the water absorbent blended to polyethylene as the base material resin, or a seal body having 5% of a highly oil absorbing resin (trade name: OLEOSORP, manufactured by Nippon Shokubai) as the oil absorbent blended to polyethylene as the base material resin are preferably used. The seal body is arranged between the respective plates provided on either side of the chain, whereby a proper pressing force can be provided in any one of an underwater atmosphere and an oil atmosphere, and the original sealing function of the seal body can be secured without increasing the bending resistance of the chain.

Since the chain with a seal body of the present invention has a seal body swollen by any one of water and oil between respective plates on either sides, even when an irregular clearance is present between the seal body and the plate, the seal body axially swells only in the part having the clearance by utilizing the surrounding water or oil to block the clearance. Thus, the seal body keeps a satisfactory transmission efficiency without increasing the bending resistance of the chain, because it is pressed to the plate with a proper pressing force, and prevents the penetration of foreign matters from the outside and the leakage of lubricating oil or abrasion powder from the seal body inner part.

The chain with a swelling seal body of the present invention is particularly useful in an underwater atmospheric use such as the food manufacturing field, and has the effect that the sealing property of the seal body is improved in the underwater atmosphere in a manufacturing process by the water absorbent being contained in the seal body to seal the lubricating oil or abrasion powder within the seal body, thereby preventing the lubricating oil or abrasive powder from accompanying water to leak from the chain, so that the adhesion of contaminant to foods can be surely prevented.

When both the water absorbent and the oil absorbent are contained in the seal body, the chain is not limited in use, and may be used in travel extending over water atmospheres and oil atmospheres.

I claim:

1. A chain with a seal body comprising:

a connecting pin;

inner and outer plates; and a swelling seal body containing a water absorbent, wherein said swelling seal body is located between said inner and outer plates which are provided on either side of said connecting pin.

2. A chain with a seal body comprising:

a connecting pin;

inner and outer plates; and a swelling seal body containing a oil absorbent, wherein said swelling seal body is located between said inner and outer plates which are provided on either side of said connecting pin.

3. A chain with a seal body comprising:

a connecting pin;

inner and outer plates; and a swelling seal body containing both a water absorbent and an oil absorbent, wherein said swelling seal body is located between said inner and outer plates which are provided on either side of said connecting pin.

* * * * *